Dec. 28, 1943.                C. C. DAVIS                 2,337,976
                         MECHANICAL COUPLING
                       Filed May 28, 1942           2 Sheets-Sheet 1
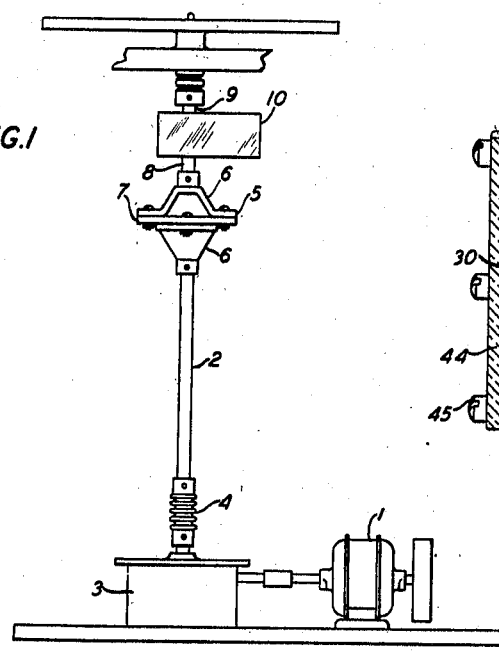
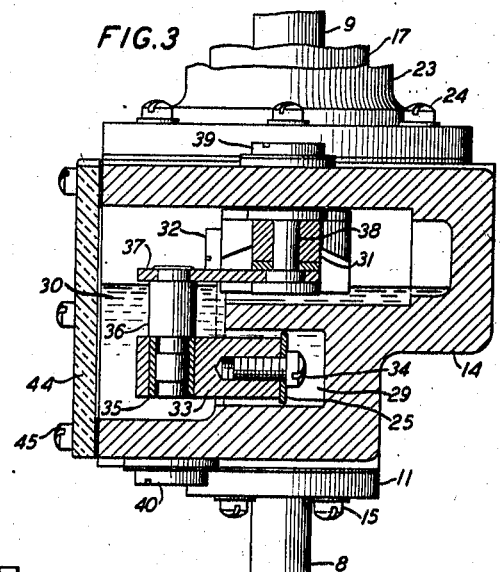
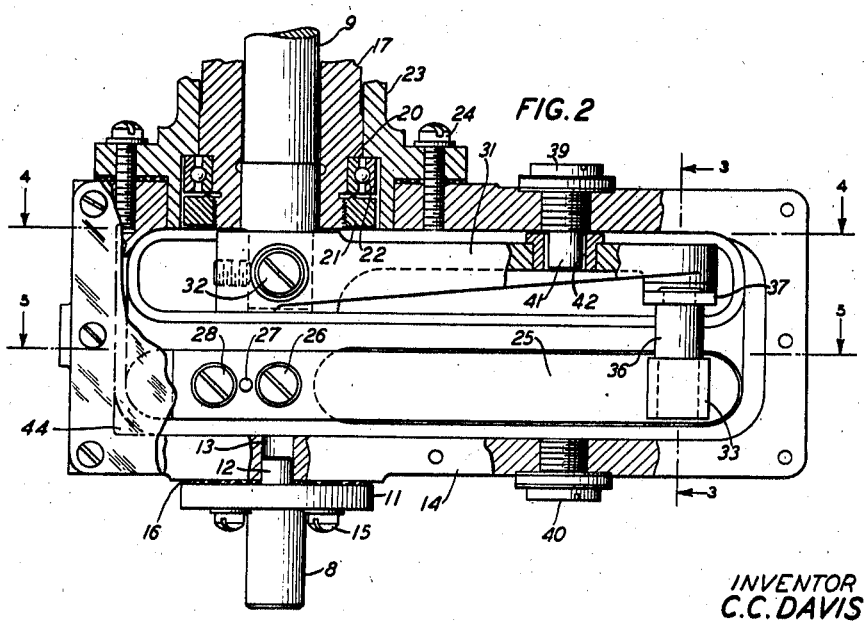
INVENTOR
C. C. DAVIS
BY
G. H. Heydt
ATTORNEY Dec. 28, 1943.     C. C. DAVIS     2,337,976
MECHANICAL COUPLING
Filed May 28, 1942     2 Sheets-Sheet 2

INVENTOR
C. C. DAVIS
BY
G. H. Heydt
ATTORNEY

Patented Dec. 28, 1943

2,337,976

UNITED STATES PATENT OFFICE 2,337,976

MECHANICAL COUPLING

Charles C. Davis, West Los Angeles, Calif., assignor to Western Electric Company, Incorporated, New York, N. Y., a corporation of New York Application May 28, 1942, Serial No. 444,870

7 Claims. (Cl. 64—27)

This invention relates to coupling devices for use in power transmission systems and more particularly to such devices adapted to suppress the transmission of velocity variations from the driving to the driven element of such systems.

The object of the invention is to provide a simple, compact and relatively inexpensive mechanical coupling device capable of effectively suppressing the transmission of velocity variations to the driven element of a power transmission system.

According to the present invention, a compact mechanical coupling having a highly efficient vibration damping characteristic is obtained by providing a radially disposed flat reed spring secured at one end to the driving shaft with its free end coupled through a mechanical linkage to the driven shaft and a damping medium completely surrounding the reed spring, the damping medium being carried in a housing attached to and rotatable with the driving shaft and spring.

While the invention will be described with reference to its application to a turntable drive in a phonograph recording and reproducing machine, it will be obvious that it may be employed in any power transmission system in which it is desired to maintain a uniform speed in the driven element.

Vibration damping couplings including resilient driving elements and a fluid damping medium have been employed heretofore in phonograph turntable driving mechanisms as disclosed in U. S. Patent 1,847,181, March 1, 1932 to H. C. Harrison. In the system such as disclosed in the above-mentioned patent, the fluid damping means is separate from the flexible coupling means between the shafts and therefore presents a relatively cumbersome mechanism, the fluid damping portion of which generally requires relatively accurate machining in the manufacture and precise adjustment in the assembly.

In accordance with this invention a coupling device having the required damping characteristics is provided in a compact structure by applying the fluid damping medium to the damping of the movement of the resilient drive coupling element. The invention achieves an efficient device by employing a flat reed spring as the resilient coupling element and so locating this spring in the assembly that it acts throughout substantially its entire length as the plunger element of a dash-pot in which the fluid damping medium in a confined area constitutes the other element of the dash-pot structure. The novel features of the vibration damping coupling in accordance with this invention may be more readily understood by reference to the following description when read in connection with the accompanying drawings in which:

Fig. 1 is an assembly view showing sufficient parts of a turntable driving mechanism to make clear how the coupling device is employed in a phonograph recording and reproducing machine;

Fig. 2 is an elevation of a coupling according to this invention;

Fig. 3 is a section taken along line 3—3 of Fig. 2;

Figure 4:
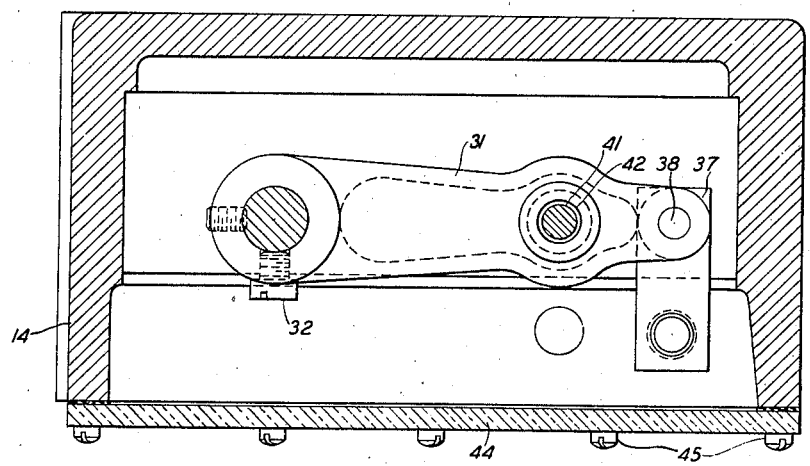
Fig. 4 is a section taken along line 4—4 of Fig. 2.
Figure 5:
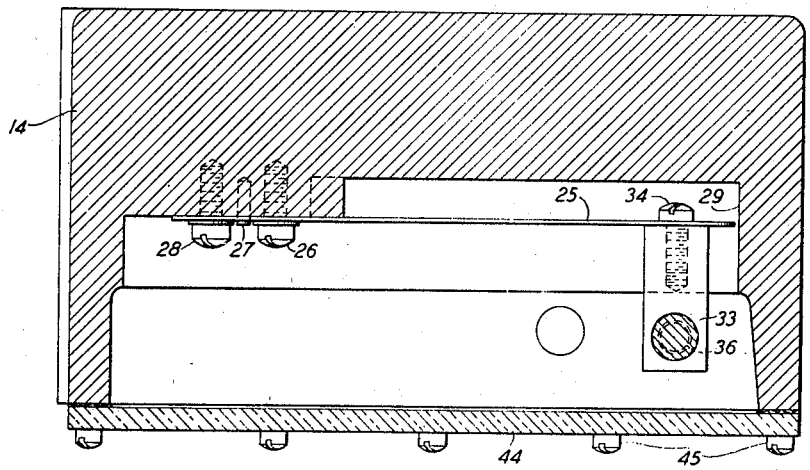
Fig. 5 is a section taken along line 5—5 of Fig. 2.

Referring to Fig. 1, the driving motor 1 supplies motive power to a vertical shaft 2 through reduction gearing in unit 3. The vertical shaft 2 is provided with a flexible coupling at each end. The lower coupling 4 is a Sylphon bellows coupling having high torsional stiffness and very great longitudinal elasticity. The upper flexible coupling 5 is a well-known universal joint type comprising yoke members 6 clamped to an annular torsional member 7. Shaft section 8, secured to the upper yoke 6, drives the turntable shaft 9 through the vibration absorbing coupling 10 forming the subject-matter of this invention.

Referring now to Fig. 2, the driving shaft 8 is provided with flange 11 and an aligning projection 12 extending into an aligning aperture 13 in housing 14. The housing 14 is secured to the driving shaft 8 to be rotatable therewith by means of machine screws 15 extending through flange 11 into the housing 14. A washer 16 prevents damping fluid leakage from the housing.

The driven shaft 9 extends into the top of housing 14 in axial alignment with driving shaft 8. A collar 17 is press-fitted on and rotatable with shaft 9. An inner race 20 of a suitable ball bearing is clamped in place on collar 17 by an internally threaded ring 21. The outer race 22 of the ball bearing is secured to a collar 23 which in turn is secured to the housing 14 by means of machine screws 24. By means of this construction the housing 14 may rotate relative to the driven shaft 9.

A flat reed spring 25 has one end secured to the housing 14 directly above the center of shaft 8 by means of a machine screw 26. This spring 25 is located in its proper position by means of a centering pin 27 cooperating with a hole in the reed spring. A further machine screw 28 may be provided to secure the extreme end of the spring to the housing. The spring 25 extends outward radially from the axially aligned shafts in a narrowed chamber portion 29 in housing 14. The lower portion of the housing including the narrow chamber portion 29 is completely filled with a suitable damping fluid 30.

One end of a rigid arm member 31, extending radially from shaft 9, is secured thereto by means of a set screw 32. The free end of the arm 31 and the free end of the reed spring 25 are coupled through a mechanical linkage. This linkage comprises a member 33 secured to the free end of reed spring 25 by machine screw 34. The member 33 is provided with a bearing 35. One end of a pivot pin 36 is rotatable in bearing 35 while the other end thereof is secured to one end of an arm 37. The other end of arm 37 is rotatable in a bearing about a pivot pin 38 secured in arm 31.

Damping fluid may be admitted to the housing 14 through the aperture closed by plug 39 and may be drained from the housing by removing a plug 40.

Plug 39 is provided with a reduced extension 41 which extends into a hole 42 in arm 31. This construction provides a limiting stop to prevent injury to the flexible element of the vibration absorbing coupling likely to be caused by excessive relative rotation between the driving and driven elements of the system particularly during the starting and stopping periods.

A transparent plate 44 forms one side wall of the housing 14 to permit observation of the interior thereof to check the level of the damping fluid. Plate 14 is secured to the housing by means of machine screws 45.

The vibration absorbing coupling may be balanced with respect to the shafts by the use of a suitable counter-balancing weight appropriately located on the housing. In power transmission systems wherein it is required to transmit greater power or wherein the rotational speed required is greater than that required for the turntable drive disclosed herein, the length of the housing on opposite sides of the shafts may be made equal and an additional pair of coupling members may be provided identical with the reed spring and linkage coupled rigid arm disclosed herein.

The flat reed spring 25 is completely surrounded by the damping fluid 30 in the confined channel 29 and movement of the spring relative to the housing in response to velocity variations is effectively damped by the dash-pot action of the spring and the damping fluid in the confining channel. The amount of damping may be controlled by the choice of damping fluid and by a suitable choice of the clearance between the edges of the reed spring and the side walls of the chamber portion of the housing. Further, the damping characteristic of the coupling unit may be controlled by a particular design of the contour of the narrow chamber portion surrounding the spring 25.

In the novel vibration absorbing coupling described herein, high amounts of damping can be obtained in a compact structure requiring simple machining and the damping characteristics thereof may be readily controlled and will remain constant throughout the life of the device.

What is claimed is:

1. In a power transmission system having driving and driven elements, means coupling said elements comprising a resilient member secured at one end to one of said elements and extending outward radially therefrom, a mechanical connection between the free end of said member and the other of said elements, a fluid damping medium surrounding said resilient member, and a container for said damping medium adapted for rotation with one of said elements.

2. In a power transmission system having axially aligned driving and driven elements, means coupling said elements comprising a resilient member secured at one end to one of said elements and extending outward radially therefrom, a rigid member secured at one end to the other of said elements and extending outward radially therefrom, a mechanical linkage connecting the free ends of said members, a housing adapted for rotation with one of said elements and a confined fluid damping medium within said housing surrounding said resilient member.

3. In a power transmission system having rotatable driving and driven elements, a rigid member secured at one end to one of said elements and extending outward radially therefrom, a resilient member secured at one end to the other of said elements and extending outward radially therefrom, means coupling the free ends of said members, a housing adapted for rotation with one of said elements and a damping medium carried in said housing and surrounding said resilient member.

4. In a power transmission system having axially aligned driving and driven shafts, vibration damping means coupling said shafts, said means comprising a housing secured to one of said shafts to be rotatable therewith, a resilient member having one end thereof secured to said housing at its axis of rotation and extending radially of said shafts, a damping medium carried in said housing and surrounding said resilient member and means connecting the free end of said resilient member to the other of said shafts.

5. In a power transmission system having rotary driving and driven elements, means coupling said elements comprising a rigid member secured at one end to one of said elements and extending outward radially therefrom, a housing secured to the other of said elements and provided with a narrowed chamber portion, a damping medium carried in said housing to fill said chamber portion, a flexible member secured at one end to said housing at the axis of rotation thereof and extending outwardly in the narrowed chamber portion, and means connecting the free ends of said rigid member and said flexible member.

6. In a power transmission system having a driving shaft and a driven shaft, a vibration damping device coupling said shafts, said damping device comprising a housing secured to said driving shaft to be rotatable therewith, said housing having a fluid filled channel extending radially from said driving shaft, a reed spring having one end secured to said housing at the axis of rotation thereof and extending outwardly in the channel in said housing, and means connecting the free end of said reed spring to said driven shaft.

7. In a power transmission system having axially aligned driving and driven shafts, a vibration damping device coupling said shafts, said damping device comprising a rigid arm secured at one end to one of said shafts, a housing secured to the other of said shafts to be rotatable therewith, said housing having a fluid filled channel extending radially from said shafts, a flat reed spring having one end secured to said housing at the axis of rotation thereof and extending along the length of and substantially midway in the channel in said housing, the width of the channel in said housing being slightly larger than the width dimension of said spring, and a mechanical linkage connecting the free end of said rigid arm and the free end of said spring.

CHARLES C. DAVIS.